United States Patent Office

2,733,270
Patented Jan. 31, 1956

2,733,270

PREPARATION OF ALDEHYDES

Earl Eugene Fisher, Wilmington, Del., assignor to E. I. du Pont de Nemours and Company, Wilmington, Del., a corporation of Delaware No Drawing. Application September 13, 1951,
Serial No. 246,520

3 Claims. (Cl. 260—604)

This invention relates to the preparation of aldehydes and, more particularly, to a process of preparing adipaldehyde.

According to British Patent 508,526, adipaldehyde is obtained by the controlled oxidation of 1,2-cyclohexanediol with hydrogen peroxide in the presence of a tertiary alcohol and an oxide of ruthenium, chromium, vanadium, or the like, as a catalyst. F. G. Fischer, Ber., 66, 666 (1933) describes the synthesis of adipaldehyde in about 60% yield by hydrogenation of cyclohexene ozonide in ethyl acetate and also, the hydrogenation of polymeric cyclohexene ozonide in alcohol suspension at 20° C.–90° C. and 20 atmospheres hydrogen pressure in the presence of palladium as a catalyst. Under these conditions, adipaldehyde tetramethyl acetal is obtained in 60% yield. The synthesis of adipaldehyde by reducing cyclohexene ozonide produced by ozonizing cyclohexene in hexane with titanous chloride in aqueous acetic acid-sodium acetate is reported in J. Chem. Soc. (London) 125, 2163 (1924).

An object of the present invention is to provide a new and improved process of preparing adipaldehyde. A further object is to provide such a process which is practical and will result in the production of adipaldehyde in good yields. Other objects will be apparent from the description of the invention given hereinafter.

The above objects are accomplished according to the present invention by reacting ozone with cyclohexene dissolved in an organic hydroxylic solvent wherein the hydroxyl group is attached to an aliphatic carbon atom, and thereafter reducing the resulting reaction product to adipaldehyde.

The present invention resides in large measure in the discovery that, contrary to what normally would be expected, a simple ozonide is not obtained when ozone is reacted with cyclohexene dissolved in an organic hydroxylic solvent wherein the hydroxyl group is attached to an aliphatic carbon atom, but rather there is obtained a product resulting from the reaction of the ozone, cyclohexene, and the solvent, and that this reaction product is readily reduced to adipaldehyde, especially when the reaction product is dissolved in an organic solvent, conveniently the one used to dissolve the cyclohexene prior to reaction with the ozone. This discovery has led to a highly advantageous process of preparing adipaldehyde from cyclohexene.

The exact structure of the reaction product of ozone, cyclohexene, and solvent, is not known but it is believed that it is a mixture of hydroperoxides which mixture varies in composition depending upon the organic hydroxylic solvent used. This mixture will be referred to hereinafter as a hydroperoxide derivative.

The first step of the process of this invention can be carried out quite simply by bubbling either ozone or oxygen-containing ozone through the solution of cyclohexene. The temperature can be varied widely although it is preferred to use a temperature between —80° C. and +40° C. The organic hydroxylic solvent must be one wherein the hydroxyl group is attached to an aliphatic carbon atom. This is a critical element in the process. It is more practical to use a lower boiling solvent, particularly saturated aliphatic monohydroxylic compounds. Suitable hydroxylic solvents are alcohols, especially the lower boiling saturated aliphatic monohydric alcohols such as methanol, ethanol, isopropanol, t-butanol and the like, and monocarboxylic acids, especially the lower boiling saturated aliphatic monocarboxylic acids such as formic, acetic, propionic, and the like. The preferred alcohols are methanol, ethanol and isopropanol because of availability and cost and the preferred monocarboxylic acid is acetic acid for the same reasons.

The second step of the instant process is the reduction of the hydroperoxide derivative and this can be effected according to techniques known in the art, either the catalytic or the chemical reduction route being suitable. When employing the catalytic route, it is convenient to place the solution of the hydroperoxide derivative in a pressure reactor which is then connected to a source of high pressure hydrogen and hydrogen is injected to a predetermined pressure. The charge is then refrigerated and maintained at the selected temperature and pressure until reaction is complete, as evidenced by cessation of pressure drop. Thereafter, the reactor is opened and the contents discharged and filtered to remove the catalysts. The adipaldehyde may be isolated by distillation, by conversion to selected derivatives, or by other means known to those skilled in the art.

When employing the chemical reduction route, the reaction can be carried out either with nascent hydrogen resulting from the reaction of an acid with a metal above hydrogen in the electromotive series or with a reducing agent such as a bisulfite, stannous chloride, hydroxylamine, titanium trichloride, potassium iodide, or similar reducing agents. Metallic zinc-acetic acid constitutes a preferred reducing mixture because it is easy to handle, low in cost, and effective in giving good yields of adipaldehyde.

The following examples illustrate specific embodiments of the invention.

*Example I*

A solution of 32.8 g. of cyclohexene in 500 cc. of methanol was treated with oxygen containing 3% of ozone for 7 hours at —75° C. To one-half of the solution of the hydroperoxide derivative thus obtained there was added 0.10 g. of palladium-on-charcoal catalyst containing 5% palladium and the mixture treated with hydrogen under 35–40 lb./sq. in. pressure, with occasional cooling to maintain the temperature at 0–10° C. Distillation of the reaction mixture yielded 12.2 g. of adipaldehyde, b. p. 49–51° C. at 15. mm., in 54% yield, based on the cyclohexene used.

*Example II*

A solution of 60 g. of cyclohexene in 500 cc. of methanol was treated with oxygen containing ozone as in Example I. A weight gain of 27 g. indicated a 77% conversion to the hydroperoxide derivative, based on the cyclohexene used. The product was hydrogenated in the presence of 2.5 g. of a palladium-on-charcoal catalyst containing 5% palladium, at —5° C. and 50 lb./sq. in. pressure. From the reaction mixture there was isolated 41 g. of adipaldehyde, which corresponds to a 70% yield based on the hydroperoxide derivative.

*Example III*

A solution of 60 g. of cyclohexene in 500 cc. of methanol was treated for 8 hours at —75° C. with oxygen containing 3% ozone. From the weight gain it was calculated that there had been a 73% conversion, based on the cyclohexene employed. Hydrogenation of the resulting hydroperoxide derivative in the original solvent at +5° C. and 50 lb./sq. in. pressure in the presence of 1.5 g. of a palladium-on-charcoal catalyst containing 5% palladium, yielded 54 g. of a product boiling at 55–70° C. at 2 mm. pressure. Ultraviolet light analysis showed this material to contain 79% adipaldehyde, which corresponds to a 74% yield based on the cyclohexene hydroperoxide derivative. Redistillation gave a fraction boiling at 70° C. at 2.5 mm. and with $n_D^{20°\,C.}$ 1.4321.

The purified fraction analyzed 62.65% carbon and 8.97% hydrogen. The calculated values for adipaldehyde are 63.07% carbon and 8.77% hydrogen.

Another fraction boiling at 72° C. at 3.5 mm. analyzed 76% adipaldehyde, by both ultraviolet light analysis and carbonyl number. The remainder of the material was shown by methoxyl determination to be probably methylacetals.

*Example IV*

Thirty-five grams (0.427 mole) of cyclohexene dissolved in 274 grams of methanol was cooled in a Dry Ice/acetone bath and treated with oxygen containing 2.5–3% ozone at a flow rate of about 0.025 cu. ft. per minute. In seven hours the solution gained 16.5 grams in weight, and contained 6 grams (0.375 mole) of peroxide oxygen according to iodometric analysis. The ozonization mixture was stored in Dry Ice overnight and then was added dropwise in 30 minutes to a solution of 82.5 grams (0.784 mole) of sodium bisulfite in 680 grams of water, with stirring and cooling to maintain the reaction mixture at —5 to 0° C. The resulting clear, colorless solution of adipaldehyde-bisulfite adduct was then held at —5° C. to 0° C. and treated with 57.5 grams (0.822 mole) of hydroxylamine hydrochloride in 110 grams of water and then, after a 15-minute period, with 96.5 grams (1.59 moles) of concentrated ammonium hydroxide. Solid adipaldehyde dioxime began to precipitate within 15–20 minutes after the addition of ammonia, and the precipitation was allowed to complete itself overnight at room temperature. The total yield of dioxime, M. P. 165–169° C., after filtering, washing with water, and drying was 35.1 grams (0.244 mole). The dioxime can be readily converted to free adipaldehyde, if desired, by known methods.

*Example V*

A mixture of 40 grams (.488 mole) of cyclohexene, 48 grams (0.80 mole) of glacial acetic acid, and 400 grams of methylene chloride was cooled in a Dry Ice-acetone bath while oxygen containing 2.5–3% ozone was bubbled through at a rate of about .025 cu. ft. per minute. At the end of 7.5 hours the ozonization was terminated, and the reaction mixture was stored overnight at Dry Ice temperature. Subsequent analysis indicated a weight gain of 17.5 grams, and a peroxide-oxygen content of 6.25 grams (0.390 mole). The solution of hydroperoxide derivative was then added dropwise to a stirred mixture of 40 g. of zinc dust and 240 g. of water in an apparatus arranged to keep the contents under a blanketing atmosphere of nitrogen and to allow methylene chloride to distill as the reaction mixture became warm from the heat of reaction. The two-layer reaction mixture was stirred under nitrogen for one hour and then was allowed to settle. The heavy methylene chloride layer was washed three times with 25 cc. portions of water, and the washed solution dried over magnesium sulfate. Distillation yielded 33.4 grams of 90–95% pure adipaldehyde boiling up to 56° C. at 0.6 mm. Pure adipaldehyde obtained by fractionation of this type of product had the following properties: B. P. 45° C./0.6 mm., $n_D^{25}$ 1.4329.

*Example VI*

Sixteen grams of a 13%, by weight, methanol solution of hydroperoxide made as in Example I, was added to a solution made by mixing a solution of 48 grams of hydroxylamine hydrochloride in 100 grams of methanol and 20 grams of water with a solution of 61.5 grams of sodium acetate in 35 grams of water. Upon mixing a gas was evolved, which analysis indicated to be 95% nitrogen, and adipaldehyde dioxime deposited. In this instance, the reducing system comprised the hydroxylamine hydrochloride and sodium acetate but there was an excess of the hydroxylamine hydrochloride present which reacted with the adipaldehyde to give the adipaldehyde dioxime.

It will be understood that the above examples are merely illustrative and that the present invention broadly comprises reacting ozone with cyclohexene dissolved in an organic hydroxylic solvent wherein the hydroxyl group is attached to an aliphatic carbon atom, and thereafter reducing the reaction product thus obtained to adipaldehyde.

As previously mentioned, a critical element of the invention is the solution of the cyclohexene in the organic hydroxylic solvent in the ozonization step. However, as illustrated in Example V, mixtures of organic hydroxylic solvents and non-hydroxylic solvents can be used in the ozonization step and, also, in the reduction step. Suitable organic non-hydroxylic solvents are chloroform, methylene chloride, hexane, carbon tetrachloride, and the like.

For practcial reasons, it is desirable to ozonize in as high concentration of cyclohexene as possible. Generally, solutions are used which contain at least 5% cyclohexene by weight. The ozonization takes place effectively by simply bubbling oxygen-containing ozone through the cyclohexene solution maintained between —80° C. and +40° C.

Using the catalytic method of reduction of the hydroperoxide derivative, the reaction may be conveniently carried out at ordinary pressures but since the hydrogenation proceeds at a faster rate under superatmospheric pressures, such pressures are preferred. Good results are obtained employing hydrogen pressures which are at least of the order of 10 lb./sq. in., but since best results are realized in the range of 20–300 lb./sq. in., the hydrogenation is preferably effected employing pressures within that range.

In order to minmize side reaction product formation, it is essential that the hydrogenation be effected at a low temperature. The particular optimum temperature in any given instance depends upon such factors as the type and amount of catalyst used, its activity, and the pressure used. Normally, good results are achieved within the temperature range of approximately —15° C. to +15° C. and that range embraces the preferred conditions. If desired, however, some departure may be had from these temperature conditions although it is preferred that the hydrogenation be carried out at a temperature below about +15° C.

A hydrogenation catalyst which is active at the temperature selected for reaction, is essential for operativeness. Useful catalysts are those of the platinum group especially metallic platinum and palladium, their oxides and salts. The catalysts may be used in supported form or they may be extended on inert supports such as carbon, silica, alumina, kieselguhr, etc. The preferred catalysts are those in which palladium is an essential component and especially those in which palladium is supported on carbon. A typical preparation of such catalysts is the following:

A solution of 4.16 g. of palladium chloride in 2.8 cc. of concentrated hydrochloric acid and 20 cc. of water is prepared by heating the mixture on a steam bath. The resulting solution is poured into a solution of 68 g. of sodium acetate trihydrate in 500 cc. of water contained in a 1 liter reduction bottle. Forty-five grams of activated carbon are added and the mixture hydrogenated until hydrogen absorption ceases. The catalyst is collected on a suction filter funnel and washed with 2 liters of water in 5 portions. The filter cake, after removal of most of the water, is dried in air and then in a dessicator over anhydrous calcium chloride. The catalyst analyzes about 5% palladium and is stored, after being powdered, in an air-tight container.

The amount of catalyst employed, calculated as the metal, is generally in the range of from 0.001% to 10% by weight of the hydroperoxide derivative. As a rule, better results, from the standpoint of reaction rate, are obtained when amounts in the range of 0.1% to 5% are employed, and that embraces the preferred catalyst concentration.

Reduction of the hydroperoxide derivative is carried out in a liquid vehicle, preferably but not necessarily a solvent therefor. For reasons of convenience and economy, the solution resulting from the ozonization step of the cyclohexene will ordinarily be used.

When the reduction of the hydroperoxide derivative has been effected in the presence of an alcohol, the adipaldehyde should be isolated as soon as feasible in order to minimize product loss through acetal formation. The separation of the adipaldehyde should be effected at as low a temperature as practical under reduced pressure.

Although the examples have illustrated batch operation in the ozonization and reduction steps, there is nothing critical about this and one or both of these steps may be carried out as a semicontinuous or as a continuous operation as those skilled in the art will appreciate.

An advantage of this invention is that it provides a simple and direct means of preparing adipaldehyde in good yields. Further, the process of this invention does not require any particularly difficult manipulative steps nor impractical conditions.

This application is a continuation-in-part of applicant's copending application Serial No. 189,301, filed October 9, 1950, and now abandoned.

As many apparently widely different embodiments of this invention may be made without departing from the spirit and scope thereof, it is to be understood that the invention is not limited to the specific embodiments thereof except as defined in the appended claims.

The invention claimed is:

1. The process for preparing adipaldehyde which comprises hydrogenating in solution in a lower boiling saturated aliphatic monohydric alcohol at a temperature controlled to be below $+15°$ C., using a hydrogen pressure of at least 10 pounds per square inch and in the presence of a platinum group hydrogenation catalyst, the reaction product produced by ozonization at a temperature between $-80°$ C. and $+40°$ C. of cyclohexene dissolved in a lower boiling aliphatic monohydric alcohol, and isolating the adipaldehyde resulting from the hydrogenation.

2. A process as defined in claim 1 wherein said ozonization reaction product is hydrogenated at a temperature controlled to be below $+15°$ C. and above about $-15°$ C., using a hydrogen pressure of 20–300 pounds per square inch and a palladium hydrogenation catalyst.

3. A process as defined in claim 2 wherein the catalyst concentration, calculated as palladium, is 0.1% to 5% of the weight of said ozonization reaction product.

References Cited in the file of this patent

Fischer et al. (German): "Catalytic Hydrogenation of Ozonides," Ber. Deut. Chem., 65B, pp. 1467–72 (1932).

Fischer: Ibid., vol. 66, p. 666 (1933).

Henne et al.: J. Amer. Chem. Soc., vol. 65, pp. 2183–2185 (November 1943).